US011202003B1

(12) United States Patent
Tanner

(10) Patent No.: US 11,202,003 B1
(45) Date of Patent: Dec. 14, 2021

(54) SWITCHABLE CLOUD-OPTIMIZED REAL-TIME STITCHING MULTIPLE IMAGER METHOD AND SYSTEM

(71) Applicant: Altia Systems, Inc., Cupertino, CA (US)

(72) Inventor: Jason Daniel Tanner, Folsom, CA (US)

(73) Assignee: Altia Systems Inc., Cupertino, CA (US)

( * ) Notice: Subject to any disclaimer, the term of this patent is extended or adjusted under 35 U.S.C. 154(b) by 613 days.

(21) Appl. No.: 13/902,772

(22) Filed: May 24, 2013

Related U.S. Application Data

(60) Provisional application No. 61/652,060, filed on May 25, 2012.

(51) Int. Cl.
*H04N 5/232* (2006.01)

(52) U.S. Cl.
CPC .............................. *H04N 5/23238* (2013.01)

(58) Field of Classification Search
CPC .... H04N 19/61; H04N 5/23238; H04N 5/232; H04N 7/181; H04N 7/147; H04N 5/23206; H04N 21/2662; G06T 3/4038; H04L 29/06027

See application file for complete search history.

(56) References Cited

U.S. PATENT DOCUMENTS

| 2002/0147773 | A1* | 10/2002 | Herman | G06T 3/0062 709/203 |
| 2005/0207487 | A1* | 9/2005 | Monroe | G08B 13/19628 375/240.01 |
| 2010/0048242 | A1* | 2/2010 | Rhoads | G06F 17/30244 455/556.1 |
| 2011/0069147 | A1* | 3/2011 | Lin | G03B 37/04 348/36 |

* cited by examiner

*Primary Examiner* — Farhan Mahmud
(74) *Attorney, Agent, or Firm* — HM Law Group LLP; Vani Moodley, Esq.

(57) ABSTRACT

A computer-implemented method for performing stitching of images to form a panoramic video stream is disclosed. The method comprises capturing images with a camera; and selectively switching between first and second modes of operation wherein corresponding to said first mode at least some of the captured images are sent to circuitry of the camera for performance of a stitching operation to stitch together the images to form a panoramic video stream and wherein corresponding to the second mode at least some of the captured images are transmitted over a network to an image optimization server provisioned in a cloud for performance of said stitching operation.

17 Claims, 14 Drawing Sheets

SWITCHABLE CLOUD-OPTIMIZED REAL-TIME STITCHING MULTIPLE IMAGER METHOD AND SYSTEM

This application claims the benefit of priority to U.S. Provisional Patent Application No. 61/652,060, which was filed on May 25 2012, the entire specification of which is incorporated herein by reference.

FIELD

Embodiments of the invention relate generally to multiple imager video systems that produce panoramic images through a process of stitching multiple images together.

BACKGROUND

Multiple imager video systems can make multiple images appear to be from a single input source through a process of stitching or blending images into a single video stream.

FIG. 1 illustrates the process of stitching together two images 100 and 102. It is to be noted that the same process applies to the case of stitching more than two images. Referring to FIG. 1, it will be seen that the image 100 includes a region of overlap 104, whereas the image 102 includes a region of overlap 108.

Solid lines 106 and 110 define merge lines. The significance of the merge lines 106 and 110 is that they demarcate redundant information on the images 100 and 102 that is to be removed during merging/stitching. Thus, for the image 100 on the left, the dotted information right of the merge line 106 (and similarly for the image 102 on the right, the dotted information left of the merge line 110) will be removed since it is redundant information. Thus, each merge line 106, 110 defines a location of the seam between the images 100 and 102. During normal operation, the seam location is retrieved from memory and used to stitch a sequence of images. The seam location is a static location identified during manufacturing.

The ideal multiple imager video system should leave a viewer unaware that multiple imagers recorded the video. Thus, the viewer has a seamless experience in which the multiple imagers appear as a single imager.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

A computer-implemented method for performing stitching of images to form a panoramic video stream is disclosed. The method comprises capturing images with a camera; and selectively switching between first and second modes of operation wherein corresponding to said first mode at least some of the captured images are sent to circuitry of the camera for performance of a stitching operation to stitch together the images to form a panoramic video stream and wherein corresponding to the second mode at least some of the captured images are transmitted over a network to an image optimization server provisioned in a cloud for performance of said stitching operation.

Other aspects of the invention will be apparent from the detailed description below.

BRIEF DESCRIPTION OF THE DRAWINGS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

The present invention, in accordance with one or more various embodiments, is described in detail with reference to the following figures. The drawings are provided for purposes of illustration only and merely depict exemplary embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
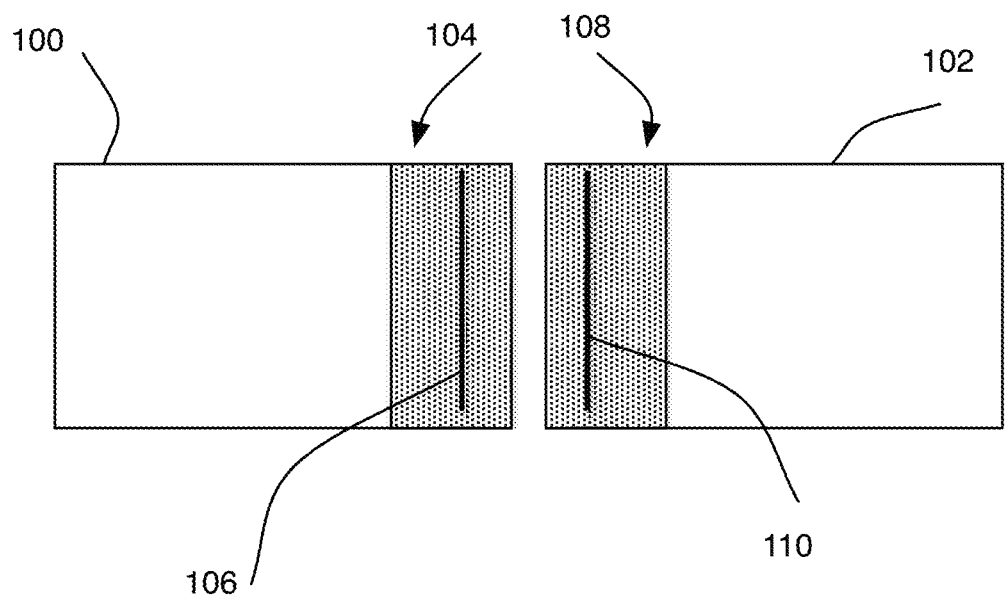
FIG. 1 illustrates the process of stitching together two images.
Figure 2:
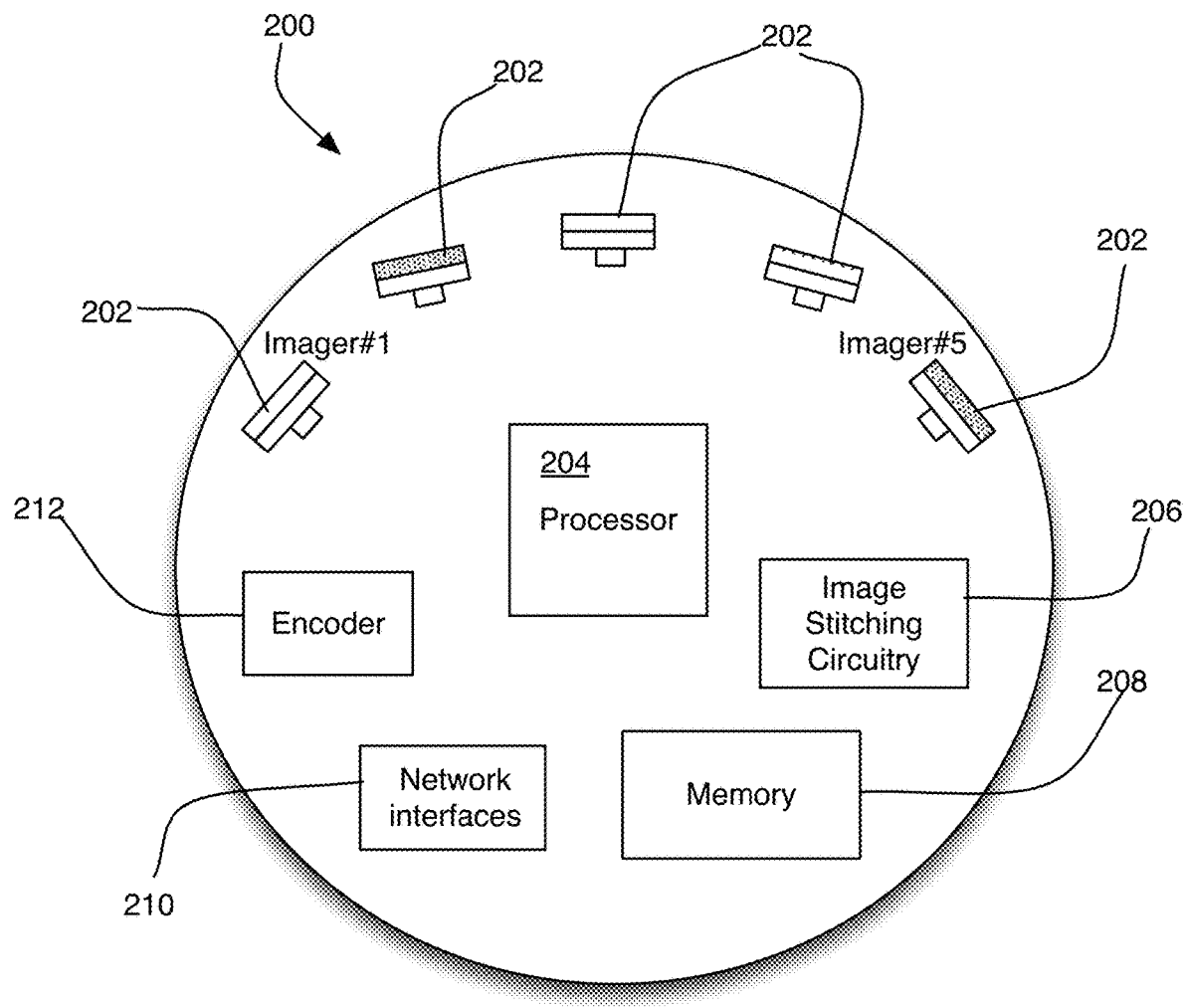
FIG. 2 illustrates an example embodiment of an apparatus configured for generating panoramic images according to one embodiment of the invention.

FIG. 2 illustrates an example embodiment of an apparatus configured for generating panoramic images according to one embodiment of the invention, in the form of multiple imager video system (camera) 200.

The system 200 includes multiple imagers/sensors 202 mounted along an arc such that each imager 202 is directed to capture a portion of a scene. Each imager 202 may include suitable sensors, for example charge-coupled device (CCD) or complimentary metal-oxide semiconductor (CMOS) imaging sensors, as is known in the art.

The system 200 also includes logic/processor 204, image stitching circuitry 206, memory 208, one or more network interfaces 210, and an encoder 212 In one embodiment, digital signals recorded by sensors 202 are sent to the logic/processor 204 for processing. In one embodiment, the logic/processor 204 may execute programs for implementing image processing functions and calibration functions, as well as for controlling the operation of the entire device 200 including its image capture operations. Optionally, the logic/processor 204 may include signal processing functionality for performing image processing, including image filtering, enhancement and for combining multiple fields of view in cooperation with the image stitching circuitry 206, as will be explained in greater detail below Although shown separately, in some embodiments, the image stitching circuitry 206 may exist as part of the logic/processor 204. It is to be understood that components of the device 200 may take the form of hardware, software, firmware, or any combination of hardware, software, and firmware.

Digital signals representing a panoramic view may be stored in memory 208. The encoder 212 may compress digital signal before transmission across via a network interface 210. The network interfaces 210 may be configured to provide network connectivity to the device 200. As such, the network interfaces 210 may include wireless and wired interfaces, in accordance with different embodiments.

Each image sensor 202 captures a different portion of a scene to be imaged. When stitching to together images from the imagers 202 it is important for objects across a seam align properly with at least minimal artifacts.

Accordingly, embodiments of the present invention disclose techniques for performing cloud-based optimizations in respect of images generated by the camera 200 in real time.

Figure 3:
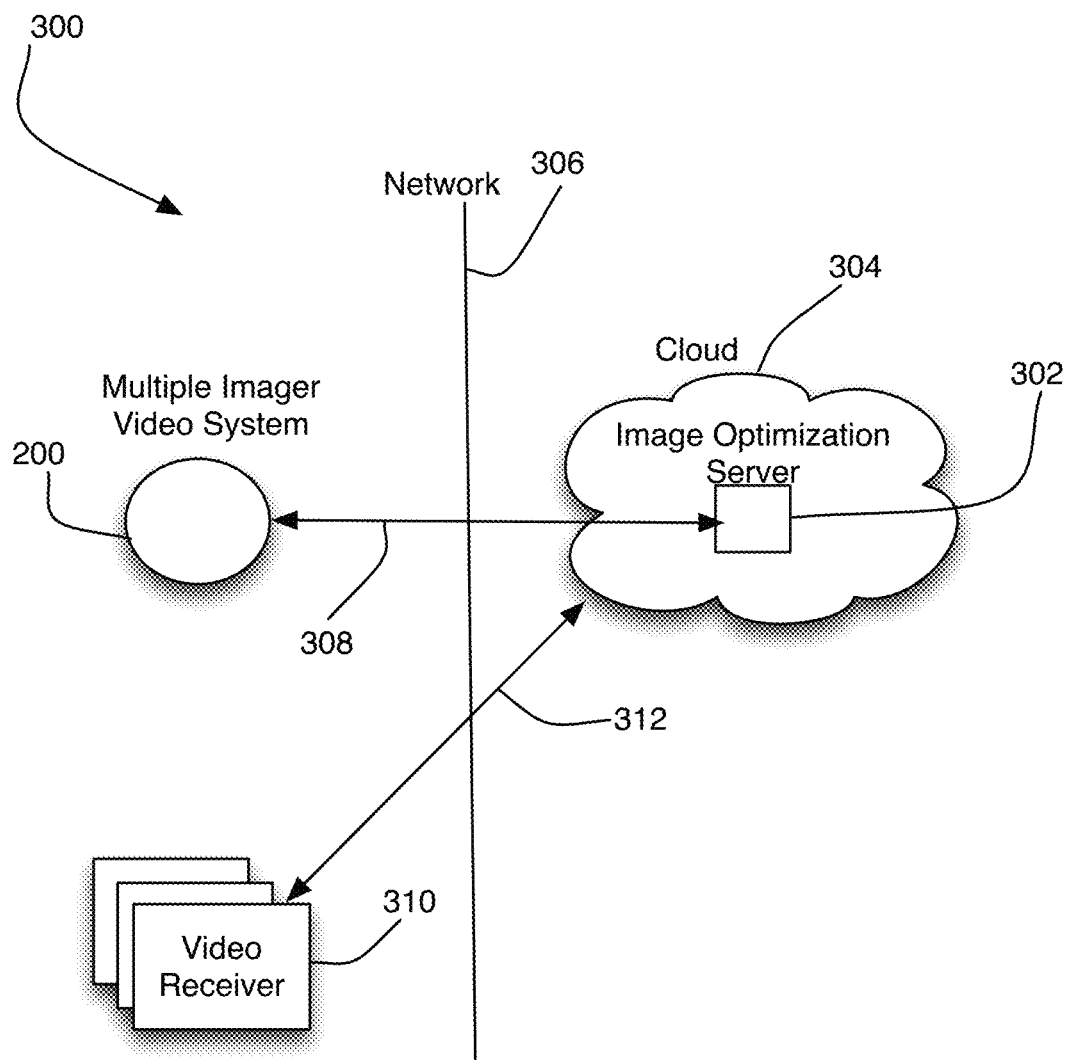
FIG. 3 shows a network environment in which a camera is connected to an image optimization server, in accordance with one embodiment of the invention.

In one embodiment, the camera 200 may be deployed in a network environment 300 as shown in FIG. 3. Referring to FIG. 3, it will be seen that the network environment 300 includes an image optimization server (IOS) 302 located in a cloud 304 and accessible via a network 306. As used herein, the term "cloud' refers to computing resources (software and hardware) configured to provide services over a network (the network 306 in this instance). In one embodiment, the cloud 304 may be private or public and the network 304 may be a private or public network. In one embodiment, the network 306 may be a wide-area network (WAN) such as the Internet. The camera 200 may include the necessary interfaces 210 to establish a communications link 308 with the IOS 302 via the network 306.

In one embodiment, the IOS 302 may perform at various types of image optimizations to optimize images received from the camera 200 via the communications link 308. These optimizations will be described later. In one embodiment, a video stream comprising the optimized images may to sent or streamed to at least one video receiver 310 via a communications link 312 established through the network 306.

For the camera 200, the location of the seam for images from each pair of adjacent images is determined for a specific distance during manufacturing, and is stored in the memory 208. The location of the seam is also known as alignment. In one embodiment the alignment of the camera 200 may be optimized based on spatial and temporal information in a video sequence. One particular technique for optimizing the alignment is described in co-pending U.S. patent application Ser. No. 13/902,370, which in incorporated herein by reference in its entirety.

Using alignment optimization, the camera 200 calculates the ideal stitching location and streams it to a cloud or to remote viewers.

Figure 4:
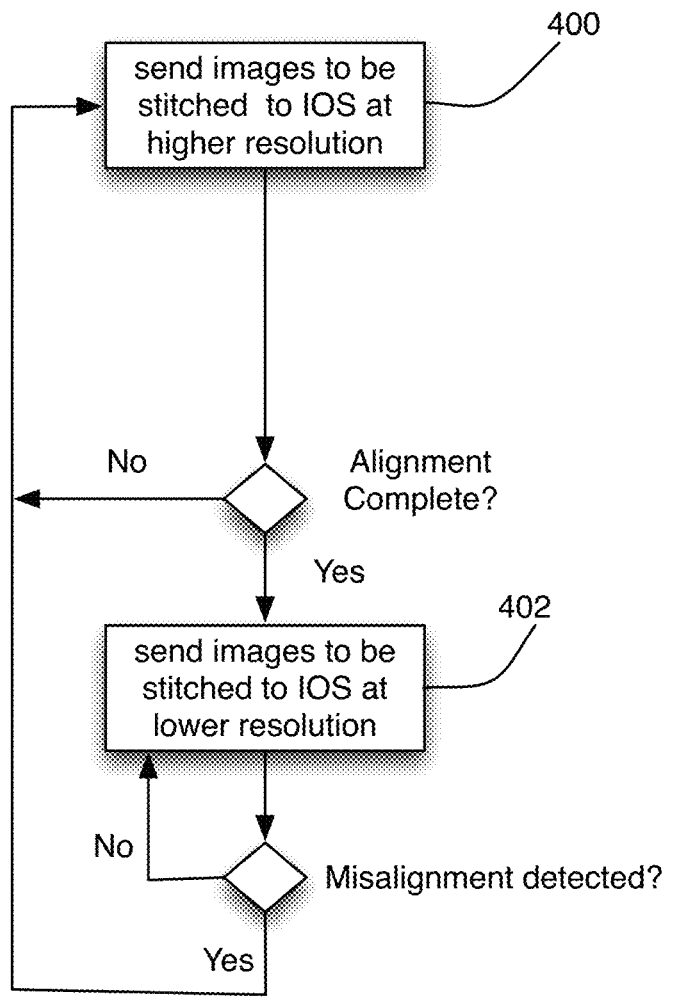
FIGS. 4 and 5 a technique for a dynamically scaling the resolution of images transmitted to the image optimization server of FIG. 4, in accordance with one embodiment of the invention.
Figure 5:
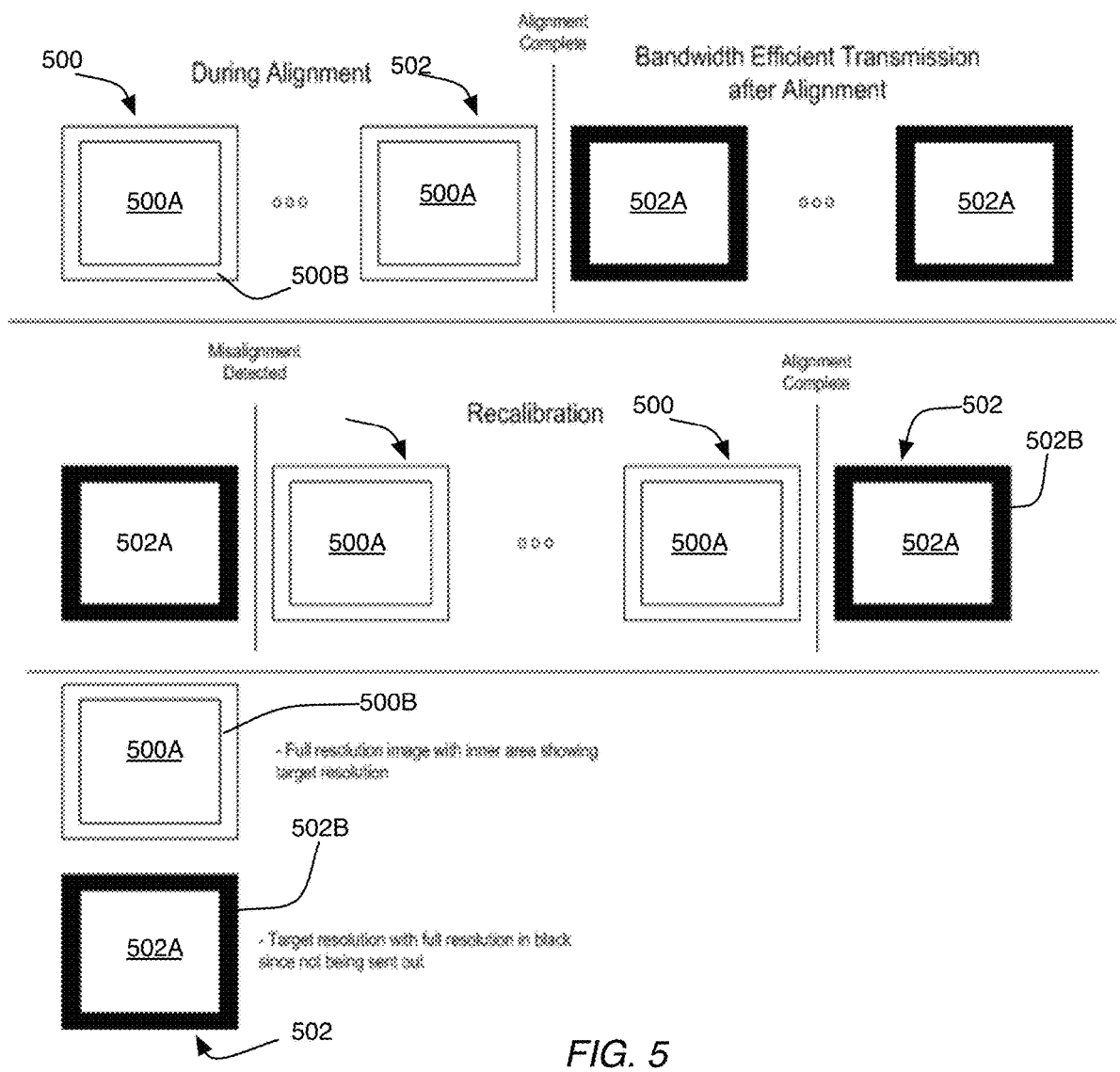

For the IOS 302 to perform alignment optimization and stitching of images, images captured by the imagers 202 in the camera 200 are transmitted to the IOS 302 via the communications link 308. One embodiment of the invention (illustrated in the flowchart of FIG. 4) discloses a technique for dynamically scaling the resolution of the images transmitted to the IOS 302 for stitching. Said method begins at block 400 where the images to be stitched are sent to the IOS 302 at a higher resolution. In one embodiment, this higher resolution may include a full resolution as opposed to a target or lower resolution. In FIG. 5 reference numerals 500 and 502 indicate full resolution and target resolution images, respectively. As will be seen, the full resolution images 500 include an inner area 500A defining the target resolution which is surrounded by a border area 500B. Reference numerals 502 indicate lower resolution images comprising a border area 502B of cropped pixels in black surrounding an inner area 502A defining the target resolution. Thus, at block 400 full resolution images 500 are transmitted to the IOS 302.

Responsive to receipt of the full resolution images, the IOS 302 performs image alignment to dynamically change the location of a seam used to stitch the images together. In one embodiment, the IOS 302 notifies the camera 200 once the alignment of the images is complete, whereupon the camera executes processing block 402 wherein the images are sent to the IOS 302 at a lower resolution. In one embodiment, the images 502 shown in FIG. 5 exemplify the lower resolution images. Thus, for alignment purposes images from the camera 200 are sent to the IOS at a higher or full resolution and advantageously only at a lower or target resolution once the images are properly aligned thereby saving on transmission bandwidth of the link 308. The IOS 302 continues to stitch the images received at the lower resolution and transmits the stitched images to the video receivers 310 until it detects that a change in the current seam location is indicated. In one embodiment, stitching artifacts along the seams of the stitched images may indicate such a change. For example features across a seam may be misaligned, thus indicating that the current seam location needs to be changed. In one embodiment, the IOS 302 may notify the camera that a misalignment has been detected, which case the camera 200 switches to once again transmitting full resolution images to the IOS 302 to enable the IOS 302 to performed a recalibration/alignment of the current seam as indicated in FIG. 5.

In addition, to optimizations relating to seam alignment described above, in one embodiment, the IOS 302 may optimize stitching based on device resolution. The precision for a device receiving a high-resolution stream at a high bitrate can be higher than a device receiving a stream at a low bitrate and/or low resolution.

An encoded video stream comprising a sequence of images including redundant parts/information located in the region of overlap between images would requires more bits for transmission than if said redundant parts were to be omitted. Said redundant information will also be referred to herein as "sideband" information. Given that there is a limited amount of bandwidth, using some of that bandwidth to transmit redundant information (information that will be thrown out and not sent to the user) would result in lower quality video. Advantageously, in one embodiment, the camera 200 selectively transmits redundant information to the IOS 302 as shown in the flowchart of FIG. 6, while keeping a constant canvas size associated with the transmission.

Figure 6:
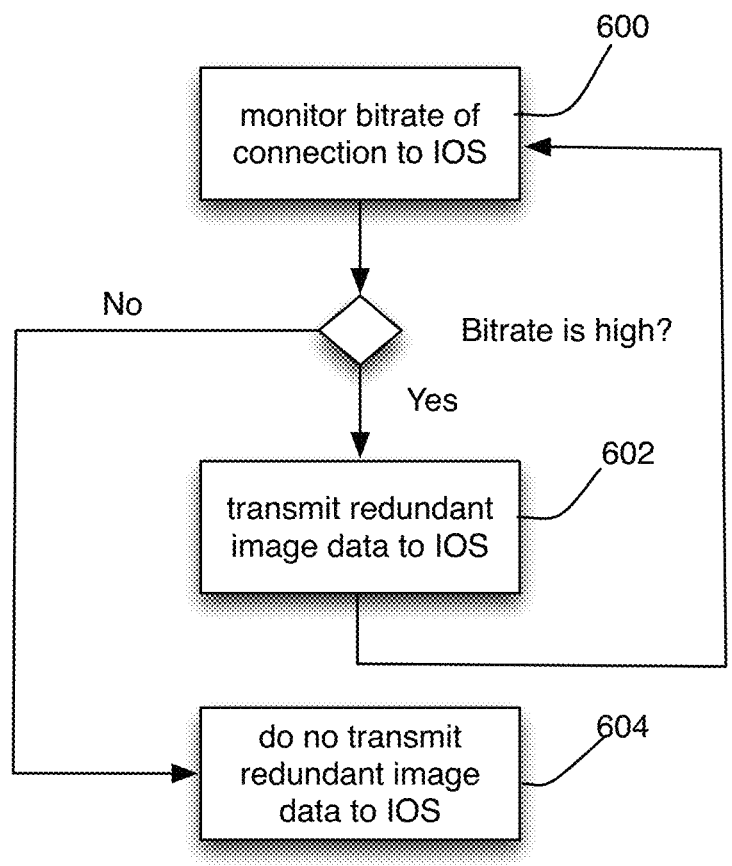
FIG. 6 shows a technique for selectively transmitting redundant information to the image optimization server of FIG. 4, in accordance with one embodiment of the invention.

Referring to FIG. 6, at block 600 the camera 200 monitors the bitrate of the connection to the IOS 302. If the bitrate is determined to be high based on some predefined threshold, then the images that are transmitted to the IOS 302 include redundant information contained in regions of overlap between adjacent images. However, in the event that the bitrate between the camera and the IOS 302 drops to below the threshold bitrate then the camera 200 switches to a mode in which the images are send to the IOS 302 without the redundant information. In one embodiment, an aspect ratio of the images in the transmitted video stream may be maintained by the replacing the redundant information with black or gray pixels. The black pixels may have a very minor impact on the video quality of the rest of the stream.

In one embodiment, each frame may be divided into smaller blocks. Each block is encoded using different modes such as inter (temporally predicted) or intra (spatially predicted). The blocks may be transformed into the frequency domain (using the discrete cosine transform (DCT) for AVC or h.264). Coefficients in the frequency domain may be subdivided by a quantization parameter (QP). The QP may vary block to block across the frame (in AVC or h.264 the QP ranges from 0 to 51). The lower the QP, the higher the quality and more bits that are used and vice versa for higher QP. In one embodiment, a portion of the video may be transmitted with minimal bits (and therefore with little impact on available bandwidth). For instance a skip macroblock (MB) in AVC may have a derived motion vector and no coefficients and thus may require significantly less bits for transmission. There may be frames that require all intra (spatially predicted) blocks. For these frames, all the coefficients may be zeroed out to require few bits. A block that requires minimal bits for transmission is referred to herein as a "skipped macroblock."

In one embodiment, the encoder 212 may set the macroblocks (MBs) with the black pixels to skipped macroblocks. Advantageously, by selectively transmitted the redundant information in the manner described more bits will be spent on the actual content instead of the redundant information in case where transmission bitrates are low.

Figure 7:
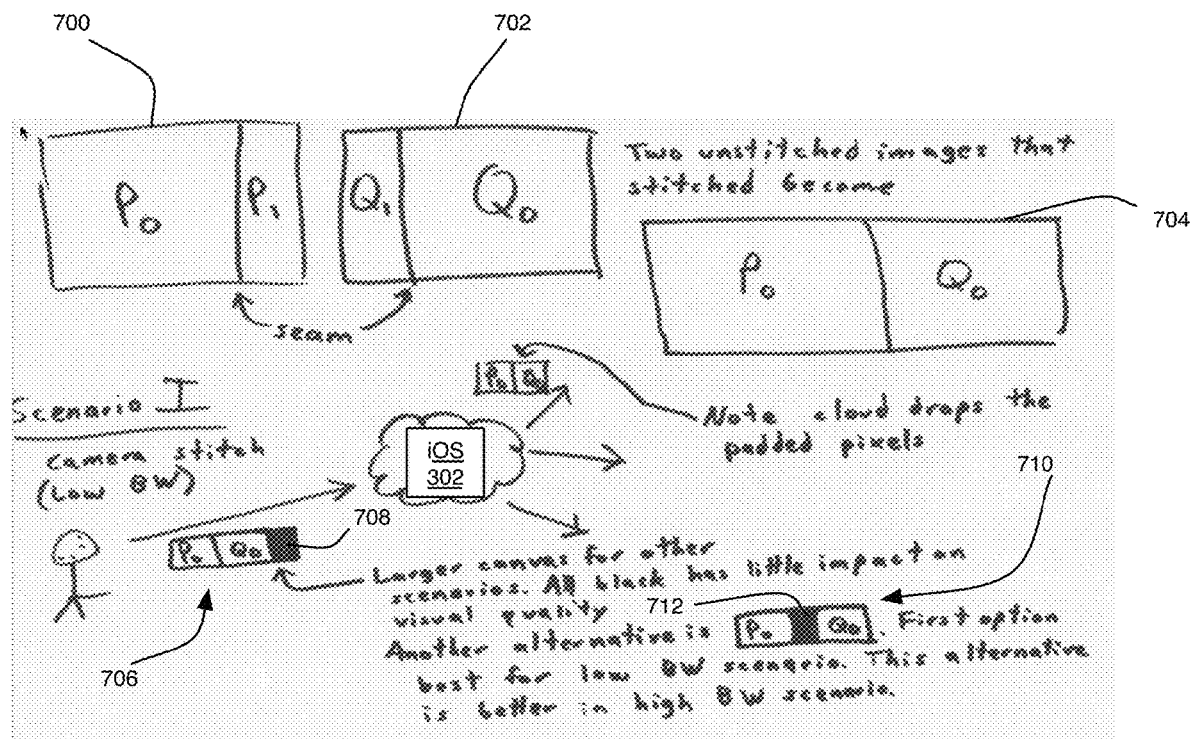
FIG. 7 shows a first scenario, in accordance with one embodiment of the invention.

FIG. 7 illustrates a first scenario/mode for transmitting images from the camera 200 to the IOS 302. Referring to FIG. 7, two images 700 and 702 are to be transmitted to the IOS 302 for stitching. The images 700 and 702 exemplify left and right images, respectively that are to be stitched. The image 700 includes a main portion $P_0$ and a second portion $P_1$. Likewise, the image 702 includes a main portion $Q_0$ and a second portion $Q_1$. The portions $P_1$ and $Q_1$ comprise redundant pixels from a region of overlap between the images 700 and 702. A final stitched image 704 based on the images 700 and 702 includes the regions $P_0$ and $Q_0$ as shown. For this scenario the camera 200 performs the stitching. When the bandwidth of the connection from the camera 200 to the IOS 302 is low, the camera 200 sends transmissions 706 or 710 to the IOS 302. As will be seen each of the transmissions 706 and 710 includes a black pixel region (indicated as 708 for the transmission 706, and as 712 for the transmission 710), and the main portions $P_0$ and $Q_0$. Pixels associated with the black pixel regions 708 and 712 may be encoded as skipped macroblocks to conserve transmission bandwidth. The difference between the regions 708 and 712 is that the region 708 is transmitted as a sideband, whereas the region 712 is transmitted in-band. The presence of the regions 708 and 712 in the transmissions ensure that the canvas size associated with the transmissions remains the same.

Figure 8:
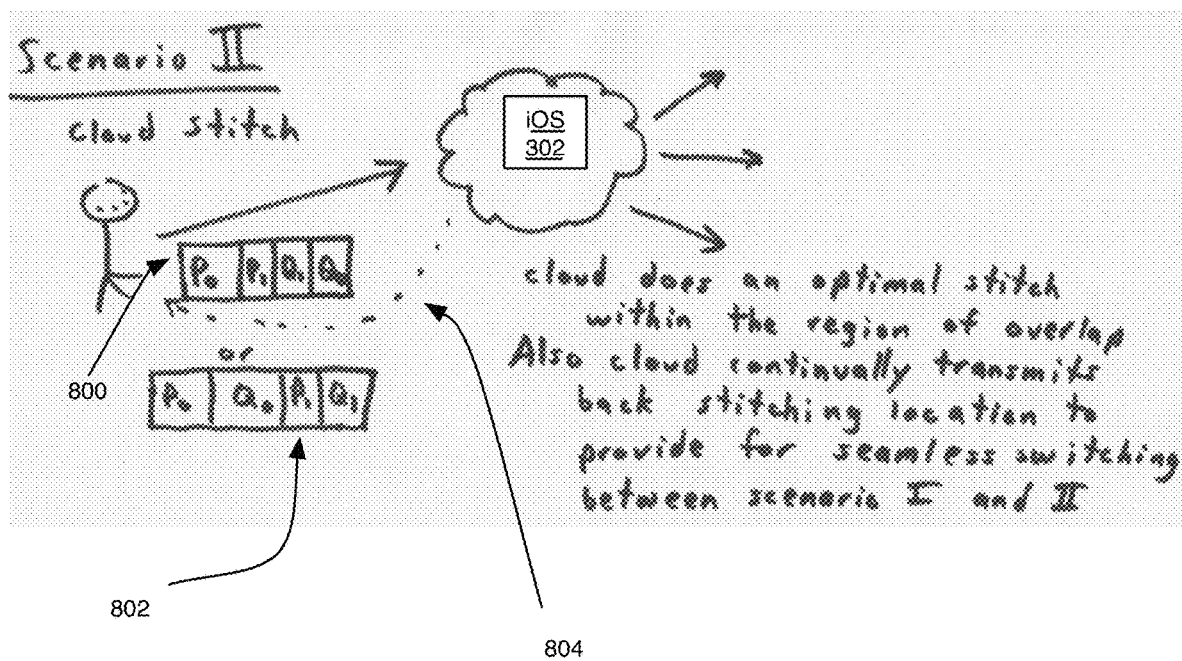
FIG. 8 shows a second scenario, in accordance with one embodiment of the invention.

FIG. 8 of the drawings illustrates a second scenario/mode that is implemented when the bandwidth of the connection from the camera 200 to the IOS 302 is high. For the second scenario, the camera 200 sends transmissions 800 and 802 to the IOS 302. As will be seen the transmissions 800 or 802, each comprise the main portions $P_0$ and $Q_0$ as well as the portions $P_1$ and $Q_1$ comprising redundant pixels from a region of overlap between the images 700 and 702. Responsive to the transmissions 800 or 802, the IOS 302 stitches the images and transmits the stitched images to the receivers 310. The IOS 302 also sends the location of the seams used for the stitching to the camera 200. The seam locations may be used by the camera 200 to continue with the stitching as per the first scenario, in case the bandwidth drops.

Figure 9:
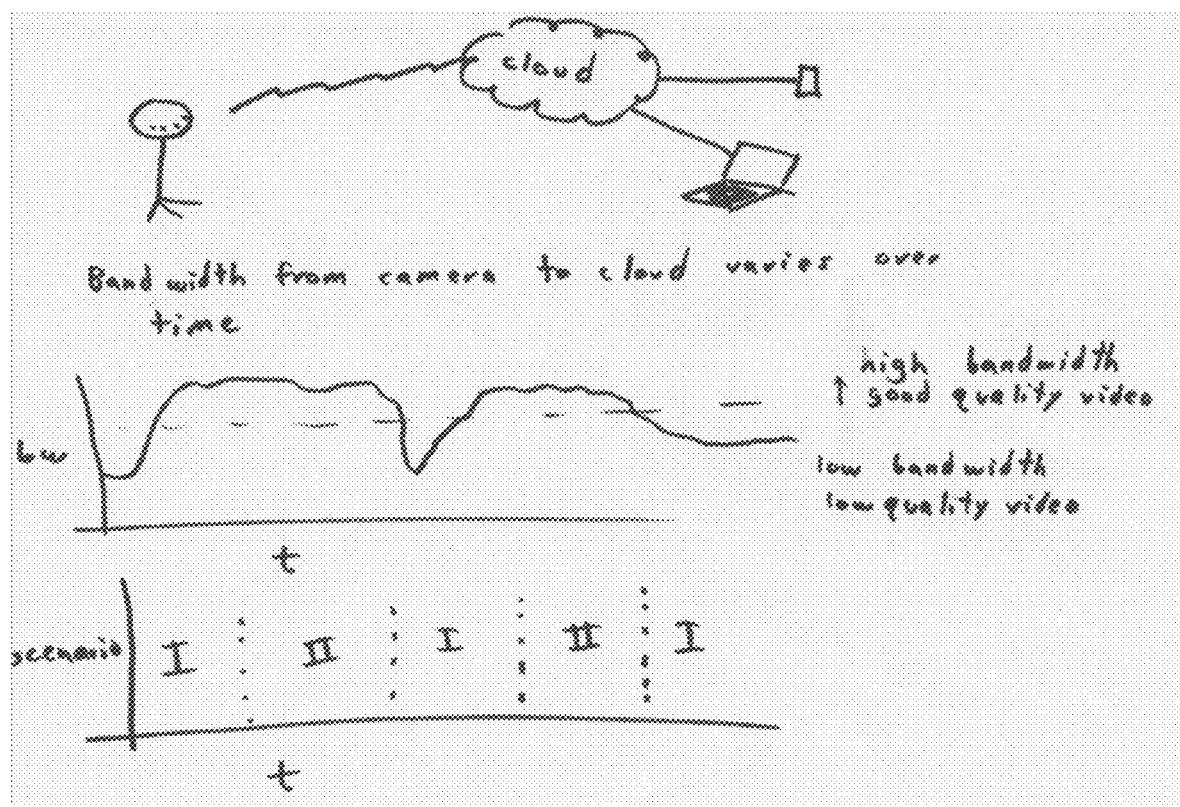
FIG. 9 illustrates how the system of FIG. 2 seamlessly switches between the first and second scenarios, in accordance with one embodiment of the invention.

FIG. 9 indicates which of the two scenarios gets executed based on available bandwidth of the connection from the camera 200 to the IOS 302. As will be seen, when the bandwidth is low the first scenario executes, and when the bandwidth is high the second scenario executes. Advantageously, in one embodiment, the camera 200 is configured to seamlessly switch between the two scenarios.

Figure 10:
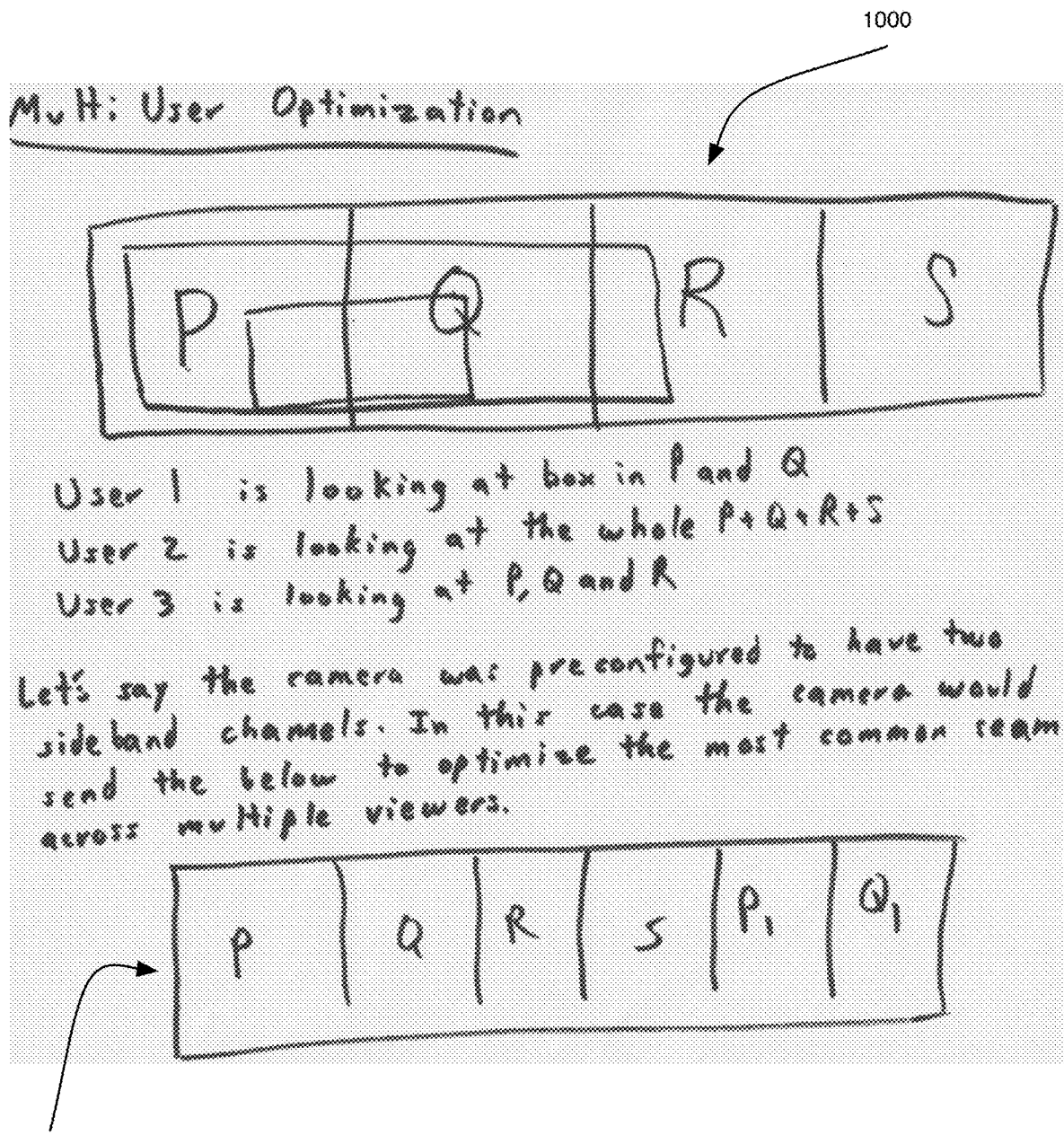
FIG. 10 illustrates how the system of FIG. 2 optimizes transmissions for multiple users/viewers, in accordance with one embodiment of the invention.

In one embodiment, transmissions from the camera 200 may be optimized in the case of multiple users. This is illustrated with reference to FIG. 10 of the drawings. Referring to FIG. 10, reference numeral 1000 generally indicates a panoramic scene shown to Users 1, 2, and 3. Assume that the following information is transmitted to the camera 200 from the IOS 302 based on information collected on zooming and panning operations performed by each user on their respective receiver 310 while watching the scene 100:

User 1 is looking at image area P and Q;

User 2 is looking at the whole scene, i.e. image areas P, Q, R, and S;

User 3 is looking at image areas P, Q, and R.

If the camera 200 is configured to transmit information in sidebands as discussed above, the transmission 1002 may be transmitted to the IOS 302, in one embodiment. As will be seen, the transmission 1002 includes the portions $P_1$ and $Q_1$ comprising redundant pixels from a region of overlap between the images 700 and 702. Information from the region of overlap associate with image areas P and Q were selected for transmission because the image areas P and Q were the most viewed areas of the scene based for all users. Thus, in one embodiment, the camera 200 optimizes transmissions for multiple users by transmitting the regions of overlap associated with the most viewed parts of the scene.

Figure 11:
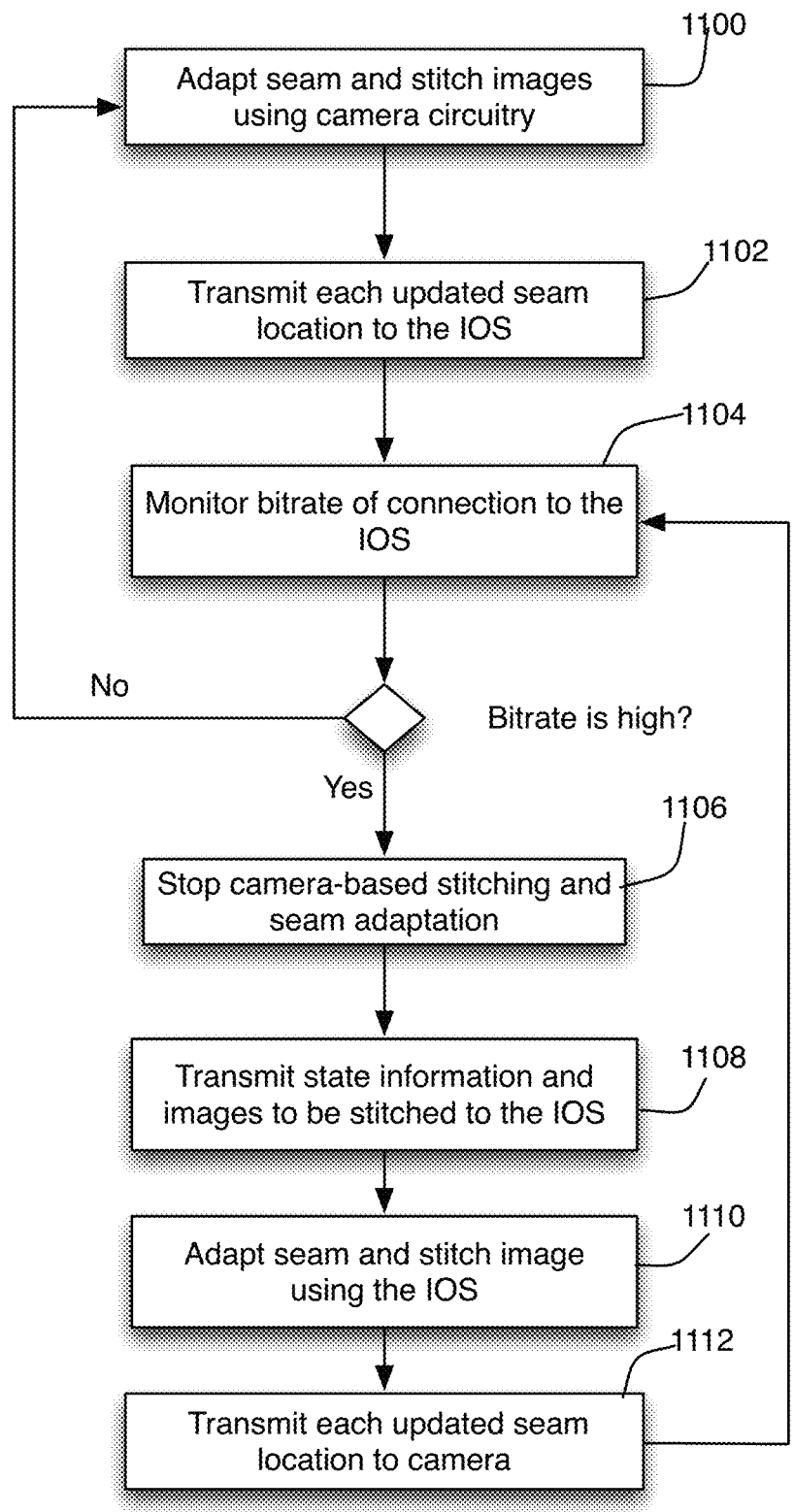
FIG. 11 shows a process for seamless switching between a local camera and the image optimization server of FIG. 4 for stitching, in accordance with one embodiment of the invention.

In one embodiment, to enable image stitching is a switched manner between the cloud/IOS 302 and the camera 200 in a seamless fashion, the camera 200 and the IOS 302 constantly update each other with the current seam location. The process for seamless switching between the cloud/IOS 302 and the camera 200 for stitching is illustrated in the flowchart of FIG. 11. Referring to FIG. 11, at block 1100, the camera 200 initially does the stitching. In one embodiment, the camera 200 has the ability to dynamically adjust the stitching location in accordance with the techniques disclosed in co-pending U.S. patent application Ser. Nos. 13/902,186 and 13/902,248, each of which is incorporated herein by reference in its entirety. As the seam is adapts over time, each change in seam location may be transmitted by the camera 200 to the IOS 302. Processing block 1102 in FIG. 11 indicates this. At block 1104, the camera 200 monitors the bitrate of the connection to the IOS 302. If the bitrate/bandwidth is high (e.g. relative to a threshold) indicating sufficiency to transmit high quality video, the stitching location becomes fixed in the camera 200 and camera-based stitching and seam adaptation stops as indicated by block 706. The IOS 302 may continue to dynamically adjust the seam starting from its current location as indicated by the camera 200. In one embodiment to facilitate dynamic seam adjustments by the IOS 302 in a seamless manner, at block 1108 the camera 200 may transmit state information pertaining to the current location of the seam to the IOS 302.

In one embodiment, responsive to receiving the state information and the images to be stitched, the IOS 302 merges or stitches the different sections of video to create a merged surface that is transmitted to multiple devices at block 1110.

In one embodiment, at block 1112 as the IOS 302 adjusts the position of the seam, the new position is transmitted back to the camera 200. In one embodiment, a drop in bandwidth between camera 200 and IOS 302 would switch the stitching so that it is performed by the camera 200. Such a switch would be seamless as the camera 200 already has the last seam location used by the IOS 302 for stitching and is able to continue stitching based on that seam location.

In one embodiment, an on-demand technique for switching to cloud stitching is disclosed. With this embodiment, the camera 200 operates as normal. That is to say the camera stiches images based on a seam location stored in memory. However, if the camera detects that a seam matches between two images across which features match poorly then the camera transmits the mismatching region to the IOS 302. The IOS 302 in turn computes a new improved seam location and adjusts that for the outbound image and the camera. The new seam location is transmitted to the camera. In one embodiment, once the camera 200 adjusts to the new input, the region of overlap is disabled as discussed above (skip MV or intra without coefficients). The IOS 302 only starts to stitch when the camera start sending side band information.

A multiple imager camera with N imagers has N−1 seams. Depending on the amount of overlap between each imager, the amount of redundant information in the region of overlap could approach the size of the final output. Thus, transmitting redundant data for N−1 seams could have a very significant effect on image quality. Even creating a canvas to transmit the final video and (N−1)*2 channels of redundant data could strain encoder/decoder performance as well as the final video quality.

Each user device used to view the final stitched video streamed from the IOS 302 knows the region of interest for each viewer, e.g. based on zooming and panning activities by the viewer. In one embodiment, information on the region of interest is transmitted to the IOS 302 from each user device. The IOS 302 uses that information to communicate to the camera 200 which regions of interest are most viewed. The camera 200 can then enable streaming of that region of interest. The IOS 302 can then optimize the stitching for a seam located in the region of interest. Other seams may be disabled to save bandwidth.

To further optimize the bandwidth for multiple users, in one embodiment, space allotted for redundant regions of interest may be limited to a fixed number. For example, for 6 imagers (5 seams), the total number of side band channels for all regions of overlap would be 10. However, to limit the size of the canvas and optimize for bitrate, the camera can limit the number of side band channels to 4 (two seams). The IOS 302 then selects the two most important seams and the camera would provide their regions of overlap in those 4 slots to be optimized in the cloud. The IOS 302 can use several factors to decide which regions to optimize including:

bandwidth available to the user device since small improvements in the seam would not be noticed with poor video quality;

face recognition to see which seams have people located in them.

motion predicted for which seams are most likely to have motion enter the seam;

user device resolution since lower resolution devices would not notice changes as much;

activity on the device since an idle device could imply lack of participation; and current view of the device since someone looking at the whole scene would not notice the differences in a particular seam as much as someone who is focused on that seam.

Although a video stream of stitched images can be sent directly from the camera 200 to the user devices or video receivers 310, the benefit of cloud computing can apply additional algorithms to enhance the quality of the video stream. For example, last second transrate adaptation (adjusting the video bitrate on the fly) can provide quicker adaptation to downstream network conditions on the fly. During transrate, the cloud (IOS 302) can have more computing resources to encode video based on difference references or standards such as Context-Adaptive Binary Arithmetic Coding (CABAC), etc. or even transcode to a new codec format to minimize bandwidth downstream (such as streaming to a mobile device).

Figure 12:
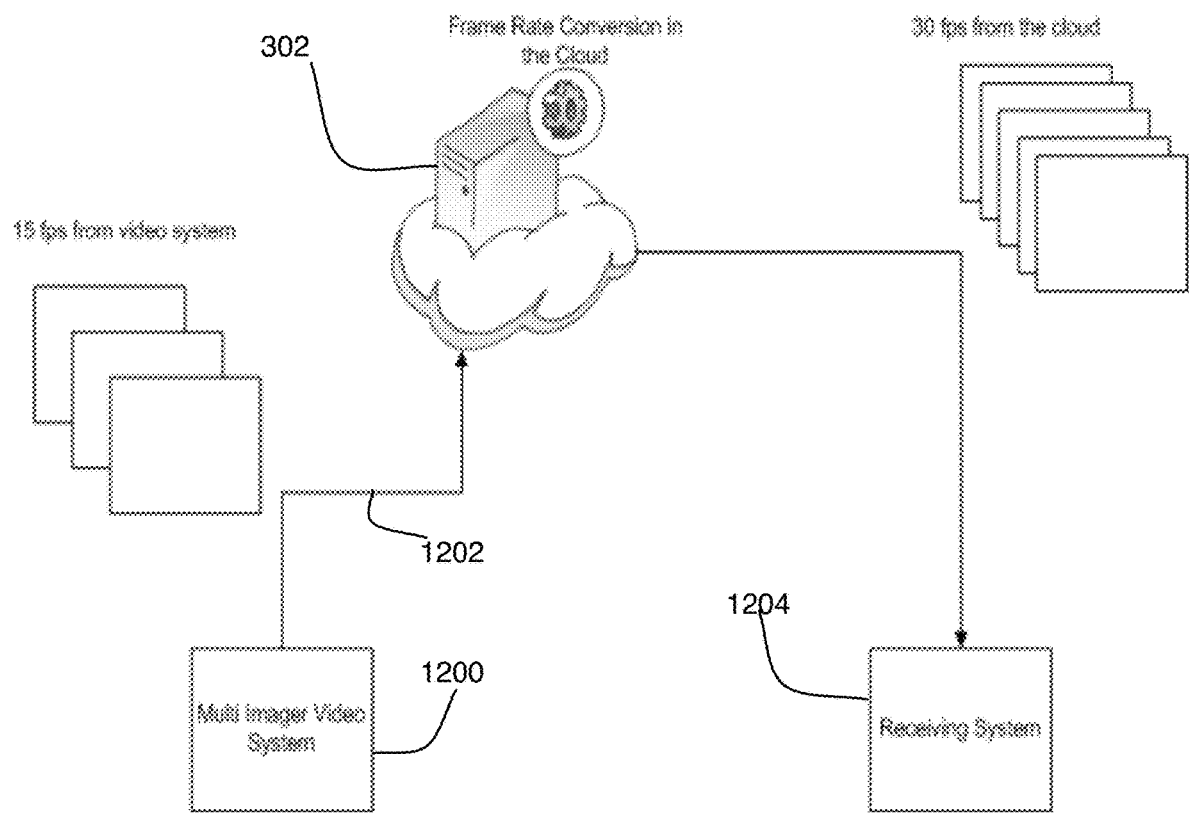
FIG. 12 illustrates a scenario for transrate adaptation or frame rate conversion, in accordance with one embodiment of the invention.

FIG. 12 illustrates a scenario for transrate adaptation or frame rate conversion, in accordance with one embodiment. Referring to FIG. 12, a local host 1200 (camera 200) sends images at a rate of 15 fps (frames per second) via an upstream link 1202 that is limiting the frame rate to get the best quality. The local host 1200 may indicate regions of the frame that have motion to speed up the computations in the cloud. The images are sent to IOS 302 that performs a frame rate conversion to deliver the images at a frame rate of 30 fps to a receiving system (user device) 1204.

Super resolution can provide a more accurate high resolution "digital zoom" to improve the visual quality for an end user. If receiving system runs of bits or packets get lost in transmission, the cloud can perform error correction and use temporal information to create a more accurate version of the scene.

In some embodiments white balance and exposure adjustments could be further enhanced through cloud processing.

A more advanced denoise can remove compression or other visual artifacts and retransmit the video. From the multiple images, the cloud can create a scene reconstruction, depth map creation, 2D to 3D conversion, gesture recognition, face detection and/or recognition, automated face resizing, ability to snap to the speaker based on audio or video analysis, etc.

Figure 13:
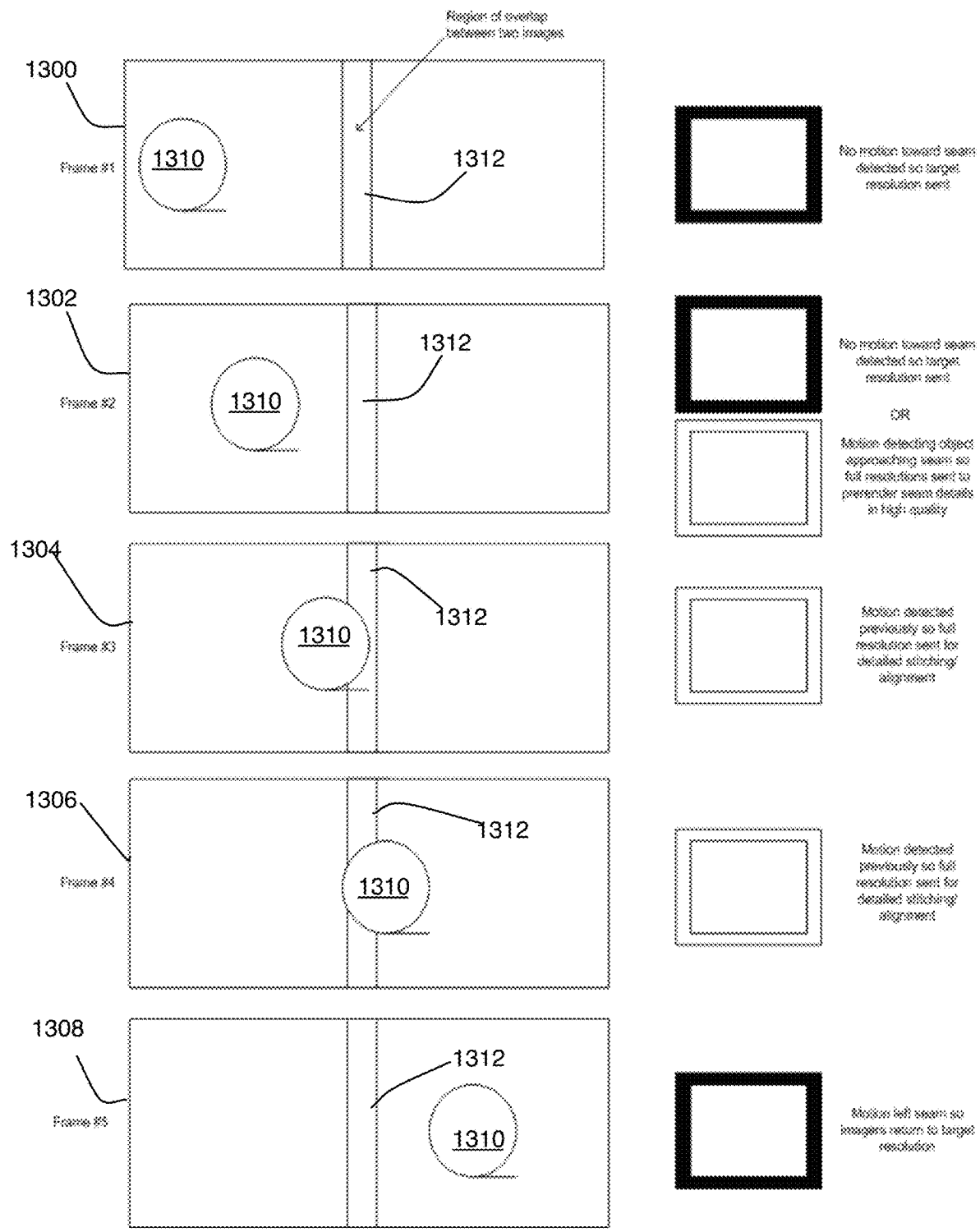
FIG. 13 illustrates how image optimization server of FIG. 4 may control the resolution of images sent to it by a local camera based on motion estimation, in accordance with one embodiment of the invention.

In one embodiment, the cloud can perform motion estimation for objects that may enter a seam. Based on that analysis, the cloud can indicate the right time for the camera 200 to send larger images in the event the seam does not match as fluidly and a quick recalibration is needed. This embodiment is illustrated in FIG. 13, which shows a sequence of frames 1300 to 1308 in which an object 1310 is moving from left to right. In frame 1300, the object 1310 is sufficiently far from a seam 1312 so that no motion towards the seam is detected. Thus, lower resolution images are transmitted to the cloud for stitching. When the object is in close proximity to the seam 1312 its motion is detected and higher resolution images are sent to the cloud in order to facilitate dynamic calculation of a new seam location. Thus higher resolution images are sent for frames 1302 to 1306. In frame 1308, the object 1310 has passed the seam 1312 indicating no need for changing the location of the current seam. Therefore, starting with the frame 1308, the images are again transmitted to the cloud at the lower or target resolution.

The cloud-based optimizations disclosed herein may apply equally to the optimization of images from a plurality of cameras, each having a singular imager. Since none of the image data is shared, the local devices/cameras do not know how to align and stitch the images. The devices can each transmit a video stream to the cloud where the cloud does the analysis and stitching to send one stream or a multiple stream out to different user devices.

Figure 14:
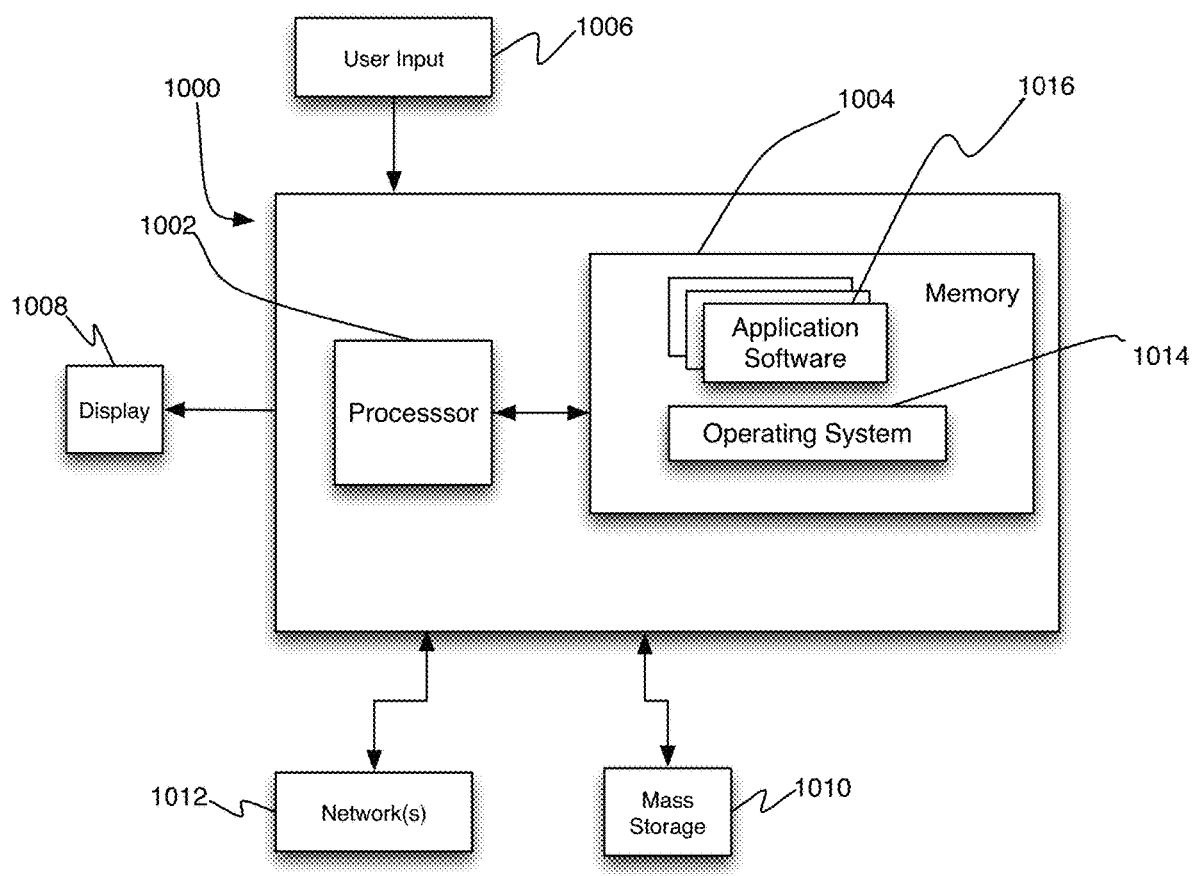
FIG. 14 shows a high-level block diagram of hardware for an image optimization server, in accordance with one embodiment of the invention.

FIG. 14 shows an example of hardware 14000 that may be used to implement the IOS 302, in accordance with one embodiment. The hardware 14000 typically includes at least one processor 14002 coupled to a memory 14004. The processor 14002 may represent one or more processors (e.g., microprocessors), and the memory 14004 may represent random access memory (RAM) devices comprising a main storage of the hardware 14000, as well as any supplemental levels of memory e.g., cache memories, non-volatile or back-up memories (e.g. programmable or flash memories), read-only memories, etc. In addition, the memory 14004 may be considered to include memory storage physically located elsewhere in the hardware 14000, e.g. any cache memory in the processor 14002, as well as any storage capacity used as a virtual memory, e.g., as stored on a mass storage device 14010.

The hardware 14000 also typically receives a number of inputs and outputs for communicating information externally. For interface with a user or operator, the hardware 14000 may include one or more user input devices 14006 (e.g., a keyboard, a mouse, a scanner etc.) and a display 14008 (e.g., a Liquid Crystal Display (LCD) panel). For additional storage, the hardware 14000 may also include one or more mass storage devices 14010, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 700 may include an interface with one or more networks 14012 (e.g., a local area network (LAN), a wide area network (WAN), a wireless network, and/or the Internet among others) to permit the communication of information with other computers coupled to the networks. It should be appreciated that the hardware 14000 typically includes suitable analog and/or digital interfaces between the processor 14002 and each of the components 14004, 14006, 14008 and 14012 as is well known in the art.

The hardware 14000 operates under the control of an operating system 14014, and executes various computer software applications, components, programs, objects, modules, etc. indicated collectively by reference numeral 14016 to perform the techniques described above.

Numerous specific details may be set forth herein to provide a thorough understanding of a number of possible embodiments of a digital imaging system incorporating the present disclosure. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A computer-implemented method for performing stitching of images to form a panoramic video stream, comprising:
   capturing images with a multi-imager camera; and
   selectively switching between a local stitching mode and a remote stitching mode for a continuous stitching operation in which there is seamless switching between the local and remote stitching modes based on a dynamically determined transmission bit-rate of a network connection between the camera and an image optimization server, wherein
   corresponding to the local stitching mode at least some of the captured images are sent to circuitry of the camera in order to perform the stitching operation to stitch together the images to form a panoramic video stream if the dynamically determined the bit-rate is below a threshold, and
   corresponding to the remote stitching mode at least some of the captured images are transmitted over a network to the image optimization server provisioned in a cloud in order to continue the stitching operation to form the panoramic video stream if the dynamically determined bit-rate is above said threshold.

2. The method of claim 1, wherein when the transmission bitrate is above a threshold then the remote stitching mode is selected and when the transmission bitrate is equal or below said threshold then the local stitching mode is selected.

3. The method of claim 1, wherein transmission of the images to the image optimization server comprises transmitting the images at one of two resolutions based a control signal from the image optimization server.

4. The method of claim 3, wherein if the control signal indicates that an alignment operation by the image optimization server in respect of received information is not complete then transmitting the images at a higher resolution.

5. The method of claim 3, wherein when the control signal indicates that an alignment operation by the image optimization server in respect of received information is complete then transmitting the images at a lower resolution.

6. The method of claim 1, further comprising seamlessly switching between the local stitching mode and the remote stitching mode based on the dynamically determined bitrate.

7. A system for performing stitching of images to form a panoramic video stream, comprising:
   a multi-imager camera configured to capture a plurality of images; and
   a mechanism to selectively switch between a local stitching mode and a remote stitching mode for a continuous stitching operation in which there is seamless switching between the local and remote stitching modes based on a dynamically determined transmission bit-rate of a network connection between the camera and an image optimization server, wherein
   corresponding to the local stitching mode at least some of the plurality of captured images are sent to circuitry of the camera in order to perform the stitching operation to stitch together the images sent to form a panoramic video stream if the dynamically determined bit-rate is below a threshold, and
   corresponding to the remote stitching mode at least some of the plurality of captured images are transmitted over a network to the image optimization server provisioned in a cloud in order to continue the stitching operation to form the panoramic video stream if the dynamically determined bit-rate is above said threshold.

8. The system of claim 7, wherein when the transmission bitrate is above a threshold then the remote stitching mode is selected and when the transmission bitrate is equal or below said threshold then the local stitching mode is selected.

9. The system of claim 7, wherein transmission of the images to the image optimization server comprises transmitting the images at one of two resolutions based a control signal from the image optimization server.

10. The system of claim 9, wherein when the control signal indicates that an alignment operation by the image optimization server in respect of received information is not complete then transmitting the images at a higher resolution.

11. The system of claim 9, wherein when the control signal indicates that an alignment operation by the image optimization server in respect of received information is complete then transmitting the images at a lower resolution.

12. The system of claim 7, further comprising a mechanism to seamlessly switch between the local stitching and the remote stitching second mode based on the bitrate.

13. A non-transitory computer-readable medium having stored thereon a sequence of instructions which when executed by a system causes the system to perform a method for performing stitching of images to form a panoramic video stream, comprising:
   capturing images with a multi-imager camera; and
   selectively switching between a local stitching mode and a remote stitching mode for a continuous stitching operation in which there is seamless switching between the local and remote stitching modes based on a dynamically the determined transmission bitrate of a network connection between the camera and an image optimization server, wherein
   corresponding to the local stitching mode at least some of the captured images are sent to circuitry of the camera in order to perform the stitching operation to stitch together the images to form a panoramic video stream if the dynamically determined bit-rate is below a threshold, and
   corresponding to the remote stitching mode at least some of the captured images are transmitted over a network to the image optimization server provisioned in a cloud in order to continue the stitching operation to form the panoramic video stream if the dynamically determined bit-rate is above said threshold.

14. The non-transitory computer-readable medium of claim 13, wherein when the transmission bitrate is above a threshold then the remote stitching mode is selected and when the transmission bitrate is equal to or below said threshold then the local stitching mode is selected.

15. The non-transitory computer-readable medium of claim 13, wherein transmission of the images to the image optimization server comprises transmitting the images at one of two resolutions based a control signal from the image optimization server.

16. The non-transitory computer-readable medium of claim 15, wherein when the control signal indicates that an alignment operation by the image optimization server in respect of received information is not complete then transmitting the images at a higher resolution.

17. The non-transitory computer-readable medium of claim 13, wherein when the control signal indicates that an alignment operation by the image optimization server in respect of received information is complete then transmitting the images at a lower resolution.

* * * * *